United States Patent
Abel et al.

(10) Patent No.: US 8,707,675 B2
(45) Date of Patent: Apr. 29, 2014

(54) PRESSURE ASSISTED DIRECT DRIVE PROPORTIONAL HOT-GAS THRUSTER

(75) Inventors: Steve Abel, Chandler, AZ (US); Raymond R. Tseng, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 738 days.

(21) Appl. No.: 13/010,274

(22) Filed: Jan. 20, 2011

(65) Prior Publication Data
US 2012/0186223 A1   Jul. 26, 2012

(51) Int. Cl.
*B63H 11/10* (2006.01)
*F02K 1/00* (2006.01)
*F02K 1/18* (2006.01)

(52) U.S. Cl.
USPC ............. 60/232; 60/228; 60/242; 239/265.19

(58) Field of Classification Search
USPC ........... 60/228, 242, 233, 229, 230, 234, 235; 239/265.19; 137/495
See application file for complete search history.

(56) References Cited

U.S. PATENT DOCUMENTS

| | | |
|---|---|---|
| 4,699,351 A | 10/1987 | Wells |
| 4,826,104 A | 5/1989 | Bennett et al. |
| 5,738,138 A | 4/1998 | Grunert et al. |
| 5,741,002 A | 4/1998 | Breyer |
| 5,762,087 A | 6/1998 | Khadim |
| 6,227,247 B1 | 5/2001 | Abel |
| 6,233,919 B1 | 5/2001 | Abel et al. |
| 6,276,125 B1 | 8/2001 | Tseng |
| 6,682,316 B1 | 1/2004 | Boke |
| 6,895,991 B2 | 5/2005 | Woessner |
| 6,986,246 B2 | 1/2006 | Fujita |
| 6,986,497 B1 | 1/2006 | Starken |
| 7,357,367 B1 | 4/2008 | Christensen |
| 7,600,737 B2 | 10/2009 | Searle et al. |
| 2003/0217547 A1* | 11/2003 | Fujita .............................. 60/229 |
| 2009/0212244 A1 | 8/2009 | Pfaff et al. |
| 2010/0084587 A1 | 4/2010 | Stein |

* cited by examiner

*Primary Examiner* — Gerald L Sung
(74) *Attorney, Agent, or Firm* — Ingrassia Fisher & Lorenz, P.C.

(57) ABSTRACT

A hot-gas thruster is actuated using a relatively small electric motor. The hot-gas thruster includes a pressure assisted pilot shaft to keep electric power demand to only a few hundred watts peak and only tens of watts on average, while exhibiting relatively fast response times.

20 Claims, 3 Drawing Sheets

US 8,707,675 B2

PRESSURE ASSISTED DIRECT DRIVE PROPORTIONAL HOT-GAS THRUSTER

TECHNICAL FIELD

The present invention generally relates to proportional hot-gas valves, and more particularly relates a proportional hot-gas thruster that includes an electric motor actuated hot-gas valve.

BACKGROUND

Hot-gas thrusters are used in rockets, missiles, interceptors, and various other vehicles and environments. For example, hot-gas thrusters may be used to control vehicle propulsion, steering, lateral divert, and attitude for missiles, munitions, and various spacecraft. A hot-gas thruster typically receives high-energy gas from, for example, a solid or liquid propellant gas generator. Depending upon the particular end-use system in which the hot-gas thruster is installed, hot-gas flow through the hot-gas thruster is preferably controlled to vary the thrust, pitch, yaw, roll, spin rate, and/or other dynamic characteristics of a vehicle in flight.

Many hot-gas thrusters include one or more controllably actuated valves to control the flow of hot-gas. One preferred method of valve actuation is via a geared electric motor. Unfortunately, this type of actuation can exhibit response and/or energy usage drawbacks when relatively high levels of thrust (e.g., 500 lbf to 1,000 lbf or more) are desired from the hot-gas thruster. In particular, the response time can be relatively slow (e.g., tens of milliseconds) and/or the electric power consumption can be relatively high (e.g., more than 1 kW).

Hence, there is a need for an electric motor actuated hot-gas thruster that exhibits a relatively fast response time and relatively low electric power consumption when delivering relatively high levels of thrust. The present invention addresses at least this need.

BRIEF SUMMARY

In one embodiment, a hot-gas thruster includes an electric motor, a thruster body, a poppet valve, a suspension spring housing, a pilot shaft, and a pair of preload springs. The electric motor is operable to selectively supply a drive force. The thruster body has an inlet port, an outlet port, and an inner surface that defines a valve chamber. The inlet port is for receiving a flow of hot gas, and the outlet port defines a valve seat and a thrust nozzle. The poppet valve is disposed at least partially within the valve chamber and includes a control surface, a seating surface, an outer surface between the control surface and the seating surface, and a vent orifice in fluid communication with the outlet port. The poppet valve defines a control chamber between the control surface and the inner surface of the thruster body. The control chamber is in continuous fluid communication with the inlet port via a fill orifice. The poppet valve is movable between a closed position, in which the seating surface engages the valve seat, and a plurality of open positions, in which the seating surface does not engage the valve seat. The suspension spring housing is coupled to the poppet valve. The pilot shaft extends through the suspension spring housing and into the poppet valve, and is coupled to receive the drive force from the electric motor and responsive thereto to selectively move in either a first direction or a second direction. The pair of preload springs is disposed within the suspension spring housing. The preload springs engage both the suspension spring housing and the pilot shaft and supply opposing preload forces thereto. When the pilot shaft moves in the first direction, fluid pressure in the control chamber is vented via the vent orifice to allow the poppet valve to move toward an open position, and when the pilot shaft moves in the second direction, fluid pressure in the control chamber aids the pilot shaft to move the poppet valve toward the closed position.

In another embodiment, a hot-gas thruster control system includes an electric motor, a thruster body, a poppet valve, a suspension spring housing, a pilot shaft, and a pair of preload springs. The electric motor is configured to be selectively energized and is operable, upon being energized, to supply a drive force. The control is configured to selectively energize the electric motor. The thruster body has an inlet port, an outlet port, and an inner surface that defines a valve chamber. The inlet port is for receiving a flow of hot gas, and the outlet port defines a valve seat and a thrust nozzle. The poppet valve is disposed at least partially within the valve chamber and includes a control surface, a seating surface, an outer surface between the control surface and the seating surface, and a vent orifice in fluid communication with the outlet port. The poppet valve defines a control chamber between the control surface and the inner surface of the thruster body. The control chamber is in continuous fluid communication with the inlet port via a fill orifice. The poppet valve is movable between a closed position, in which the seating surface engages the valve seat, and a plurality of open positions, in which the seating surface does not engage the valve seat. The suspension spring housing is coupled to the poppet valve. The pilot shaft extends through the suspension spring housing and into the poppet valve, and is coupled to receive the drive force from the electric motor and responsive thereto to selectively move in either a first direction or a second direction. The pair of preload springs is disposed within the suspension spring housing. The preload springs engage both the suspension spring housing and the pilot shaft and supply opposing preload forces thereto. When the pilot shaft moves in the first direction, fluid pressure in the control chamber is vented via the vent orifice to allow the poppet valve to move toward an open position, and when the pilot shaft moves in the second direction, fluid pressure in the control chamber aids the pilot shaft to move the poppet valve toward the closed position.

In still another embodiment, a hot-gas thruster includes a thruster body, a poppet valve, a suspension spring housing, a pilot shaft, a first preload spring, and a second preload spring. The thruster body has an inlet port, an outlet port, and an inner surface that defines a valve chamber. The inlet port is for receiving a flow of hot gas, and the outlet port defines a valve seat and a thrust nozzle. The poppet valve is disposed at least partially within the valve chamber and includes a control surface, a seating surface, an outer surface between the control surface and the seating surface, an internal cavity, a chamber-to-cavity orifice, and a main vent orifice in fluid communication with the outlet port. The poppet valve defines a control chamber between the control surface and the inner surface of the thruster body. The control chamber is in continuous fluid communication with the internal cavity via the chamber-to-cavity orifice, and in continuous fluid communication with the inlet port via a fill orifice. The poppet valve is movable between a closed position, in which the seating surface engages the valve seat, and a plurality of open positions, in which the seating surface does not engage the valve seat. The suspension spring housing is coupled to the poppet valve, and includes an inner surface that defines a first housing engagement surface and a second housing engagement surface. The pilot shaft extends through the suspension spring housing and into the internal cavity of the poppet valve. The pilot shaft comprises a radially extending flange that includes a first flange engagement surface and an opposing second flange engagement surface, and is adapted to receive a drive force and is responsive thereto to selectively move in either a first direction or a second direction. The first preload spring is disposed within the suspension spring housing, engages the first housing engagement surface and the first flange engagement surface, and supplies a first preload force thereto. The second preload spring is disposed within the suspension spring housing, engages the second housing engagement surface and the second flange engagement surface, and supplies a second preload force thereto. When the pilot shaft moves in the first direction, fluid pressure in the control chamber is vented via the vent orifice to allow the poppet valve to move toward an open position, and when the pilot shaft moves in the second direction, fluid pressure in the control chamber aids the pilot shaft to move the poppet valve toward the closed position.

Furthermore, other desirable features and characteristics of the hot-gas thruster and control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although embodiments of a hot-gas thruster are described herein as being implemented in a solid propellant gas management system disposed within a projectile body, it will be appreciated that the hot-gas thruster may also be implemented in numerous other systems and environments.

Figure 1:
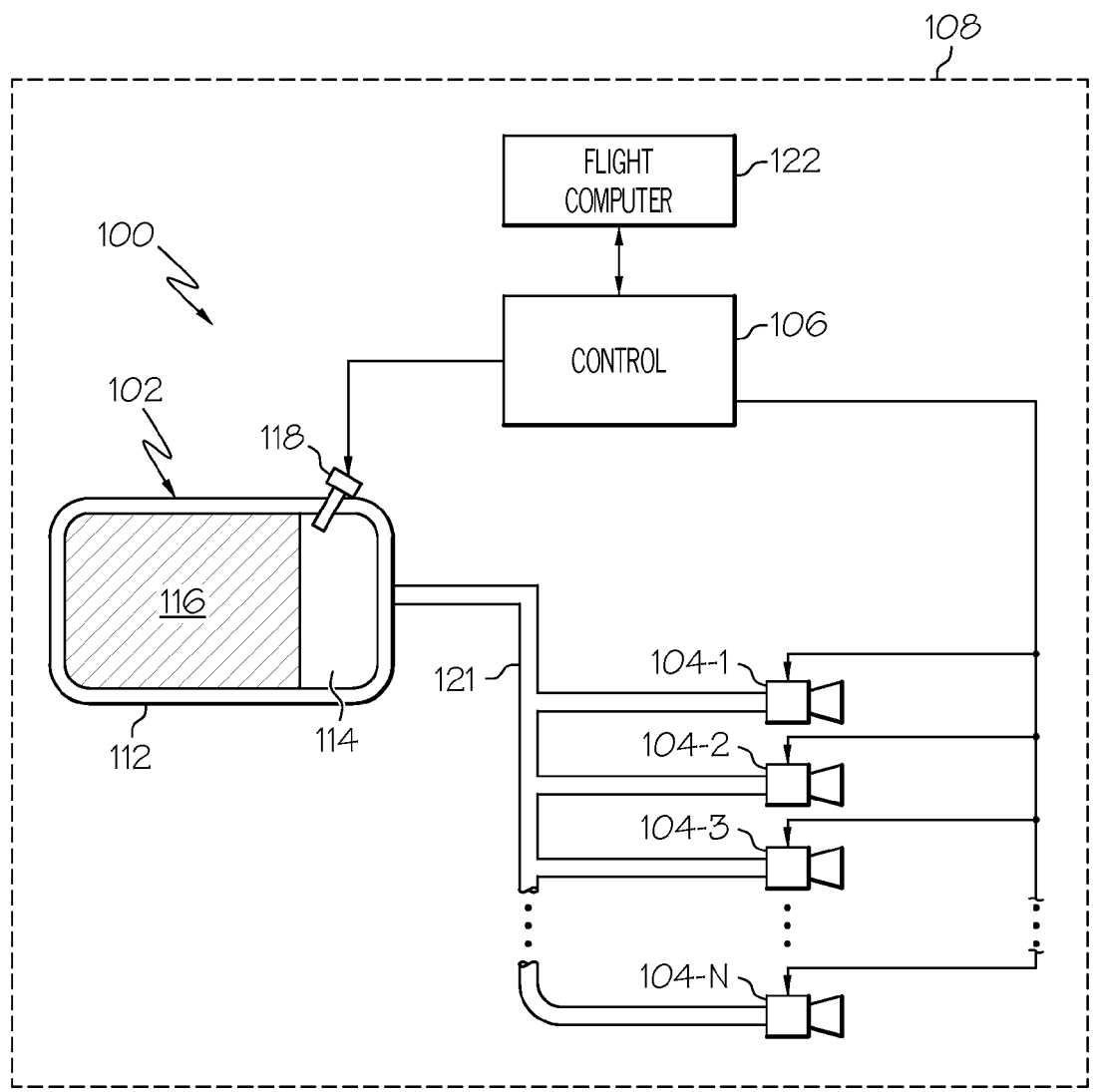
FIG. 1 is a functional block diagram of an exemplary embodiment of a solid propellant gas management system.

Turning first to FIG. 1, a functional block diagram of an exemplary embodiment of a solid propellant gas management system 100 is depicted. The system 100 includes a solid propellant gas generator 102, a plurality of hot-gas thrusters 104 (e.g., 104-1, 104-2, 104-3, ... 104-N), and a control 106, which may all be disposed within a projectile body 108. Before proceeding further, it should be appreciated that the system 100 could be implemented with additional components and/or subsystems, not just those depicted and described herein. However, a description of these additional components and/or subsystems is not needed to fully describe or enable the claimed invention, and thus is not included.

Returning once again to the description of the system 100, the solid propellant gas generator 102 includes a vessel 112 that defines a combustion chamber 114 in which a solid propellant 116 is disposed. The manner in which the solid propellant 116 is formed and subsequently loaded into the combustion chamber 114 is generally well known, and will thus not be further discussed. Moreover, the particular type of solid propellant 116 may vary. Some non-limiting examples of solid propellant 116 include ammonium nitrate and ammonium perchlorate. No matter the particular solid propellant 116 that is used, upon being ignited by an igniter 118, the solid propellant 116 produces high-pressure hot gas, which is directed toward the hot-gas thrusters 104 via, for example, a suitable manifold 121. It will be appreciated that the hot-gas thrusters 104 may be configured to function as reaction control devices, main thrust devices, or both.

The hot-gas thrusters 104 are each in fluid communication with the combustion chamber 114 via the manifold 121. The hot-gas thrusters 104 are each coupled to receive control signals from the control 106, and are each responsive to the control signals it receives to selectively generate a thrust. More specifically, and as will be described in more detail further below, each hot-gas thruster 104 is responsive to the control signals it receives from the control 106 to control the flow of hot gas therethrough in order to control the amount of thrust it produces. As will also be described in more detail below, the configuration of each hot-gas thruster 104 is such that it can generate relatively high levels of thrust, while exhibiting a relatively fast response time and consuming relatively low electric power.

The control 106, at least in the depicted embodiment, is configured to supply an initiation signal to the igniter 118 and, as noted above, control signals to the hot-gas thrusters 104. The initiation signal supplied to the igniter 118 causes the igniter 118 to ignite the solid propellant 116, which in turn generates the hot gas. It will be appreciated that in alternative embodiments the initiation signal could be supplied from other, non-illustrated devices or systems. The control signals supplied to the hot-gas thrusters 104 may be used to control thrust, maneuvering, and/or propellant burn rate. For example, the control 106 may selectively control the hot-gas thrusters 104 to maximize axial vehicle thrust, to maximize an attitude or divert maneuver, or to maximize propellant burn rate.

As FIG. 1 also depicts, the control 106 may also be in operable communication with a flight computer 122. The flight computer 122, which may be variously implemented and configured, is operable to supply flight control signals to the control 106 that are at least representative of a commanded projectile flight path. The control 106 is responsive to the flight control signals to selectively supply the control signals to the hot-gas thrusters 104. It will additionally be appreciated that the control 106 and flight computer 122, and their associated functions, could be integrated into a single device. Furthermore, the flight control signals can take the form of attitude and divert thrust, vehicle angular and linear accelerations and/or gas generator pressure.

Figure 2:
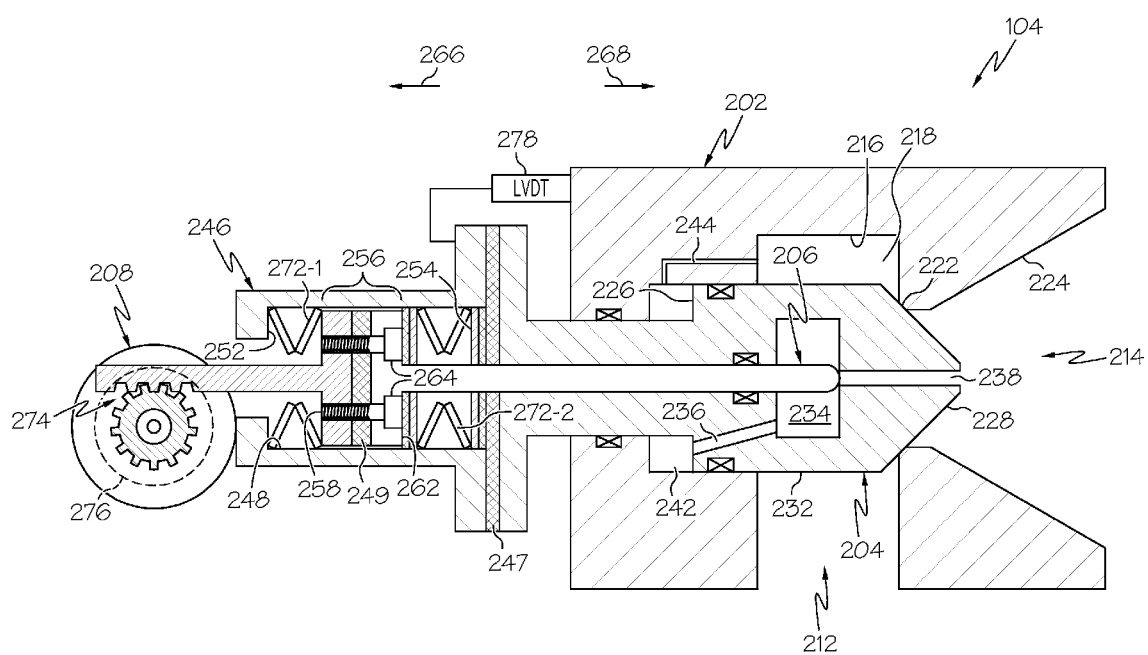
FIG. 2 depicts an exemplary embodiment of a hot-gas thruster that may be used to implement the system of FIG. 1, showing the hot-gas thruster in its closed position.

With reference now to FIG. 2, a cross section view of an exemplary embodiment of a hot-gas thruster 104 is depicted and will be described. The hot-gas thruster 104 includes a thruster body 202, a poppet valve 204, a pilot shaft 206, and an electric motor 208. The thruster body 202 includes an inlet port 212, an outlet port 214, and an inner surface 216 that defines a valve chamber 218. The inlet port 212 is coupled to receive a flow of hot gas from, for example, the solid propellant gas generator 102. The outlet port 214 defines a valve seat 222 (more clearly visible in FIG. 3) and a thrust nozzle 224.

The poppet valve 204 is disposed at least partially within the valve chamber 218 and includes a control surface 226, a seating surface 228, an outer surface 232 between the control surface 226 and the seating surface 228, an internal cavity 234, one or more chamber-to-cavity orifices 236, and a main vent orifice 238. A control chamber 242 is defined between the control surface 226 of the poppet valve 204 and the inner surface 216 of the thruster body 202, and is in continuous fluid communication with both the inlet port 212 and the internal cavity 234. In the depicted embodiment, a fill orifice 244 provides the continuous fluid communication between the control chamber 242 and the inlet port 212, and the chamber-to-cavity orifice(s) 236 provides the continuous fluid communication between the control chamber 242 and the internal cavity 234. It is noted that in the depicted embodiment the fill orifice 244 is formed in a portion of the thruster body 202. It will be appreciated, however, that in other embodiments the fill orifice 244 may be formed elsewhere. For example, it may be formed in a portion of the poppet valve 204.

The depicted poppet valve 204 is not only disposed within the valve chamber 218, but extends through the thruster body 202 and is coupled to a suspension spring housing 246. The preload (or suspension) spring housing 246, at least in the depicted embodiment, is formed as a separate component, and coupled to the poppet valve 204 via suitable fastener hardware (not depicted) and insulation disks 247, such as zirconium disks. In other embodiments, the suspension spring housing 246 may be formed integral to the poppet valve 204. In either instance, however, the suspension spring housing 246 includes an inner surface 248 that defines a first housing engagement surface 252 and, either by itself or together with other components, such as an end of the poppet valve 204, a second housing engagement surface 254.

The pilot shaft 206 extends through the suspension spring housing 246 and into the internal cavity 234 of the poppet valve 204. The pilot shaft 206 includes a radially extending flange 256 that has a first flange engagement surface 258 and an opposing second flange engagement surface 262. It should be noted that the pilot shaft 206 may be formed as an integral component or from a plurality of components. For example, in the depicted embodiment the pilot shaft 206 is formed from two sections that are coupled together via suitable fasteners 264 and an interposed zirconium disk 249. Whether formed integrally or from separate components, the pilot shaft 206 is coupled to receive a drive force from the electric motor 208. As will be described in more detail further below, the pilot shaft 206 is responsive to the received drive force to selectively move in either a first direction 266 or a second direction 268.

A pair of preload springs 272 (272-1, 272-2) are disposed within the suspension spring housing 246. The preload springs 272 engage, and supply opposing preload forces to, the suspension spring housing 246 and the pilot shaft 206. More specifically, at least in the depicted embodiment, the first preload spring 272-1 engages the first housing engagement surface 252 and the first flange engagement surface 258 and supplies a first preload force thereto. The second preload spring 272-2 engages the second housing engagement surface 254 and the second flange engagement surface 262 and supplies a second preload force thereto. This configuration provides a relatively stiff spring suspension for the pilot shaft 206. The spring rate of each preload spring 272, and the preload force supplied by each, may be varied, as will be briefly described further below, to achieve desired performance characteristics.

As noted above, the pilot shaft 206 is coupled to receive the drive force selectively supplied by the electric motor 208. The electric motor 208 is configured to be selectively energized in response to the control signals selectively supplied from the control 106 and, upon being selectively energized, supplies the drive force to the pilot shaft 206. Preferably, the electric motor 208 is coupled to the pilot shaft 206 via one or more gears 274 to convert rotary torque to linear force. In the depicted embodiment, the gears 274 are implemented using rack-and-pinion type gearing. It will be appreciated, however, that any one of numerous other types of gears may be disposed between the electric motor 208 and the pilot shaft 206. It will additionally be appreciated that the gear ratio, together with the above-mentioned spring rates, may be varied to achieve desired performance characteristics.

The electric motor 208 may also be implemented using any one of numerous types of AC or DC motors. In the depicted embodiment, however, the electric motor 208 is implemented using a permanent magnet brushless synchronous DC motor. As such, a motor position sensor 276 is coupled to the electric motor 276. The motor position sensor 276 is configured to sense electric motor rotational position and supply a rotational position signal to the control 106. Although the depicted motor position sensor 276 is implemented with a resolver, any one of numerous other rotational position sensors may also be used.

As FIG. 2 further depicts, the hot-gas thruster 104 may additionally include a valve position sensor 278. The valve position sensor 278, if included, is coupled to the poppet valve 204 and is configured to sense poppet valve position. The valve position sensor 278 is additionally configured to supply a valve position signal representative of the sensed valve position to the control 106 and/or to one or more other non-depicted systems. Although the depicted valve position sensor 278 is implemented with a linear variable differential transformer (LVDT) sensor, any one of numerous other position sensors may also be used. In some embodiments, the valve position sensor 278 may replace, and perform the function of, the motor position sensor 276.

Figure 3:
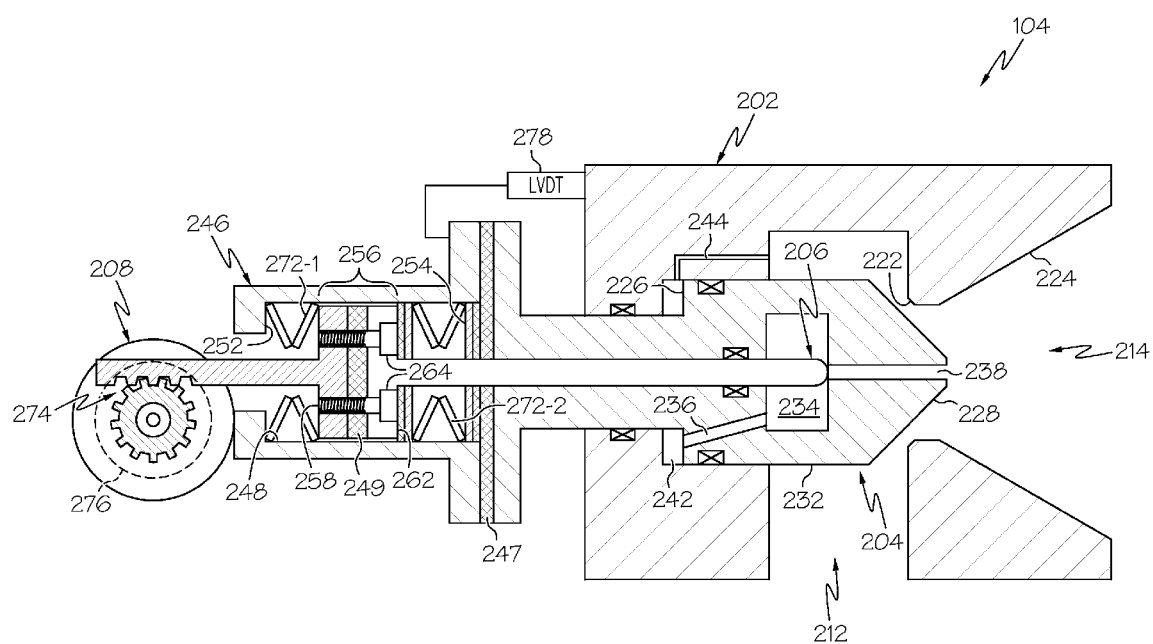
FIG. 3 depicts the exemplary hot-gas thruster of FIG. 2 in an open position.

The poppet valve 204 is movable between a closed position, which is the position depicted in FIG. 2, and a plurality of open positions, one of which is depicted in FIG. 3. In the closed position, the seating surface 228 engages the valve seat 222, thereby preventing (or at least substantially preventing) hot-gas flow from the inlet port 212 to the outlet port 214. In addition, the pilot shaft 206 also engages the main vent orifice 238, thereby preventing (or at least substantially preventing) fluid communication between the control chamber 242 and the main vent orifice 238. Conversely, in an open position, the seating surface 228 does not engage the valve seat 222, thereby allowing hot-gas flow from the inlet port 212, past the poppet valve 204, and to the outlet port 214 to generate a thrust. Additionally, the pilot shaft 206 at least selectively disengages the main vent orifice 238, thereby providing fluid communication between the control chamber 242 and the main vent orifice 238. As will now be described, the pilot shaft 206 modulates venting of the control chamber 242 as a function of the positional difference between the pilot shaft 206 and the poppet valve 204. This modulation creates a pressure in the control chamber 242 that assists the pilot shaft 206 in moving the poppet valve 204, such that the poppet valve 204 follows the pilot shaft 206 to move between its closed position and its open positions.

To open the poppet valve 204, the electric motor 208 is energized to supply a drive force to the pilot shaft 206 that causes the pilot shaft 206 to move in the first direction 266. It should be noted that the electric motor 208, due to its relatively small size, is unable to supply a drive force that alone is sufficient to move the poppet valve 204. As the pilot shaft 206 moves in the first direction 266, the first preload spring 272-1 will be compressed, and the second preload spring 272-2 will be extended. This movement also causes the pilot shaft 206 to disengage the main vent orifice 238. As a result, fluid pressure in the control chamber 242 is vented via the main vent orifice 238. When fluid pressure in the control chamber 242 decreases sufficiently, the poppet valve 204 begins to open, decompressing the first preload spring 272-1 and recompressing the second preload spring 272-2. It will be appreciated that the amount by which the pressure in the control chamber 242 decreases before the poppet valve 204 begins to open may vary. In one particular embodiment, for example, the poppet valve 204 will begin to open when the pressure decreases to approximately 80% of the supply pressure.

It should be noted that the specific open position to which the poppet valve 204 moves will depend, at least in part, on the distance that the pilot shaft 206 is moved in the first direction 266. It will additionally be noted that when the poppet valve 204 is in an open position, the venting of the control chamber 242, and the concomitant movement of the poppet valve 204, may cause the pilot shaft 206 to selectively engage and disengage the main vent orifice 238, at least until a quiescent and balanced pressure state is attained. Moreover, just after the pilot shaft 206 begins moving in the first direction 266, and prior to the poppet valve 204 beginning to move to an open position, some hot-gas may flow through the main vent orifice 238 and into and through the thrust nozzle 224. This hot-gas flow, which may be referred to as pilot flow, can be used for the minimum impulse that may be needed in some end-use applications. It may also be appreciated that prior to pressurization, when the pressure area forces and pressure induced frictions are non-existent, the pilot shaft 206 itself is able to move the poppet valve 204 via the spring suspension, thereby allowing pre-ignition built-in-test and operational assurance.

To close the poppet valve 204, the electric motor 208 is energized to supply a drive force to the pilot shaft 206 that causes the pilot shaft 206 to move in the second direction 268. As the pilot shaft 206 moves in the second direction 268, the second preload spring 272-2 will be compressed, and the first preload spring 272-1 will be extended. This movement also causes the pilot shaft 206 to engage the main vent orifice 238. As a result, fluid pressure in the control chamber 242 is no longer vented via the main vent orifice 238, and instead increases and aids the pilot shaft 206 to move the poppet valve 204 toward the closed position, decompressing the second preload spring 272-2 and recompressing the first preload spring 272-1.

It is noted that the hot-gas thruster 104 is designed such that the pressure force alone, when the poppet valve 204 is in its full-open position, is insufficient to initiate movement of the poppet valve 204 toward the closed position. This is due, at least in part, to friction forces in the hot-gas thruster 104. The drive force from the electric motor 208, together with the pressure force in the control chamber 242, will initiate movement of the poppet valve 204 toward the closed position. The hot-gas thruster 104 is also designed so that once movement toward the closed position is initiated, the pressure force begins to increase, and reaches a maximum closing force when the poppet valve 204 moves to the closed position. As a result, the control 106, at least in some embodiments, is configured to reverse the force supplied by the electric motor 208 to the pilot shaft 206 at a predetermined mid-stroke closing position to prevent the poppet valve 204 impacting too hard on the valve seat 222. In this manner a continuum of force balance links motor position proportionally to poppet valve position.

In some embodiments, the thrust nozzle 224 and the seating surface 228 are configured to form a supersonic nozzle. This has the advantage of shortening the overall size envelope by eliminating a combined blast tube and nozzle. It has the additional advantage of depressing the main vent orifice 238 back pressure, thus linearizing vent flow and enhancing overall control. It has the further advantage of reducing the nozzle pressure force component, which enhances the overall force balance across the operational stroke of the poppet valve 204.

As was noted above, the spring rates of the preload springs 272 and the gear ratio of the gears 274 may be varied to achieve desired performance characteristics. A particular design of the hot-gas thruster 104 described herein for delivering 800 lbf of thrust was modeled. The model was then used to predict the performance of the hot-gas thruster 104, and its sensitivity to gear ratio and spring rate. The results indicate response times to either a full-open or closed position of less than 10 milliseconds, peak power demand of less than 420 watts, and average power consumption of less than 55 watts. This performance, for an 800 lb-f hot-gas thruster that is actuated using an electric motor, is far superior to any that are presently known.

The hot-gas thruster 104 described herein is actuated using a relatively small electric motor and exhibits relatively fast response times. The hot-gas thruster 104 includes a pressure assisted pilot shaft 206 to keep electric power demand to only a few hundred watts peak (<420 W) and only tens of watts on average (<55 W). Furthermore, the hot-gas thruster 104 operates with the same proportionality on any type of gas from zero pressure to maximum expected operating pressure. This allows not only for pre-flight checkout but also for a variety of assurance test conditions.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A hot-gas thruster, comprising:
an electric motor operable to selectively supply a drive force;
a thruster body having an inlet port, an outlet port, and an inner surface that defines a valve chamber, the inlet port for receiving a flow of hot gas, the outlet port defining a valve seat and a thrust nozzle;
a poppet valve disposed at least partially within the valve chamber and including a control surface, a seating surface, an outer surface between the control surface and the seating surface, and a vent orifice in fluid communication with the outlet port, the poppet valve defining a control chamber between the control surface and the inner surface of the thruster body, the control chamber in continuous fluid communication with the inlet port via a fill orifice, the poppet valve movable between a closed position, in which the seating surface engages the valve seat, and a plurality of open positions, in which the seating surface does not engage the valve seat;

a suspension spring housing coupled to the poppet valve;

a pilot shaft extending through the suspension spring housing and into the poppet valve, the pilot shaft coupled to receive the drive force from the electric motor and responsive thereto to selectively move in either a first direction or a second direction;

a pair of preload springs disposed within the suspension spring housing, the preload springs engaging both the suspension spring housing and the pilot shaft and supplying opposing preload forces thereto, wherein:
when the pilot shaft moves in the first direction, fluid pressure in the control chamber is vented via the vent orifice to allow the poppet valve to move toward an open position, and
when the pilot shaft moves in the second direction, fluid pressure in the control chamber aids the pilot shaft to move the poppet valve toward the closed position.

2. The hot-gas thruster of claim 1, wherein the poppet valve further comprises an internal cavity into which the pilot shaft extends, the internal cavity in continuous fluid communication with the control chamber.

3. The hot-gas thruster of claim 2, wherein the poppet valve further comprises a chamber-to-cavity orifice that provides the continuous fluid communication between the internal cavity and the control chamber.

4. The hot-gas thruster of claim 1, wherein:
the suspension spring housing comprises an inner surface that defines a first housing engagement surface and a second housing engagement surface;
the pilot shaft comprises a radially extending flange, the flange including a first flange engagement surface and an opposing second flange engagement surface;
one of the pair of preload springs engages the first housing engagement surface and the first flange engagement surface; and
another of the pair of preload springs engages the second housing engagement surface and the second flange engagement surface.

5. The hot-gas thruster of claim 1, wherein the fill orifice is formed in the thruster body.

6. The hot-gas thruster of claim 1, wherein the fill orifice is formed in the poppet valve.

7. The hot-gas thruster of claim 1, wherein at least portions of the thrust nozzle and control surface define a supersonic nozzle.

8. The hot-gas thruster of claim 1, further comprising one or more gears disposed between the electric motor and the pilot shaft.

9. The hot-gas thruster of claim 1, further comprising a motor position sensor coupled to the electric motor and configured to sense electric motor rotational position.

10. The hot-gas thruster of claim 1, further comprising a valve position sensor coupled to the poppet valve and configured to sense poppet valve position.

11. A hot-gas thruster control system, comprising:
an electric motor configured to be selectively energized and operable, upon being energized, to supply a drive force;
a control configured to selectively energize the electric motor;
a thruster body having an inlet port, an outlet port, and an inner surface that defines a valve chamber, the inlet port for receiving a flow of hot gas, the outlet port defining a valve seat and a thrust nozzle;
a poppet valve disposed at least partially within the valve chamber and including a control surface, a seating surface, an outer surface between the control surface and the seating surface, and a vent orifice in fluid communication with the outlet port, the poppet valve defining a control chamber between the control surface and the inner surface of the thruster body, the control chamber in continuous fluid communication with the inlet port via a fill orifice, the poppet valve movable between a closed position, in which the seating surface engages the valve seat, and a plurality of open positions, in which the seating surface does not engage the valve seat;
a suspension spring housing coupled to the poppet valve;
a pilot shaft extending through the suspension spring housing and into the poppet valve, the pilot shaft coupled to receive the drive force from the electric motor and responsive thereto to selectively move in either a first direction or a second direction;
a pair of preload springs disposed within the suspension spring housing, the preload springs engaging both the suspension spring housing and the pilot shaft and supplying opposing preload forces thereto,
wherein:
when the pilot shaft moves in the first direction, fluid pressure in the control chamber is vented via the vent orifice to allow the poppet valve to move toward an open position, and
when the pilot shaft moves in the second direction, fluid pressure in the control chamber aids the pilot shaft to move the poppet valve toward the closed position.

12. The hot-gas thruster control system of claim 11, further comprising a motor position sensor coupled to the electric motor, the motor position sensor configured to sense electric motor rotational position and supply a rotational position signal representative thereof to the control.

13. The hot-gas thruster control system of claim 11, wherein the poppet valve further comprises:
an internal cavity into which the pilot shaft extends, the internal cavity in continuous fluid communication with the control chamber; and
a chamber-to-cavity orifice that provides the continuous fluid communication between the internal cavity and the control chamber.

14. The hot-gas thruster control system of claim 11, wherein:
the suspension spring housing comprises an inner surface that defines a first housing engagement surface and a second housing engagement surface;
the pilot shaft comprises a radially extending flange, the flange including a first flange engagement surface and an opposing second flange engagement surface;
one of the pair of preload springs engages the first housing engagement surface and the first flange engagement surface; and
another of the pair of preload springs engages the second housing engagement surface and the second flange engagement surface.

15. The hot-gas thruster control system of claim 11, wherein the fill orifice is formed in the thruster body.

16. The hot-gas thruster control system of claim 11, wherein the fill orifice is formed in the poppet valve.

17. The hot-gas thruster control system of claim 11, wherein at least portions of the thrust nozzle and control surface define a supersonic nozzle.

18. The hot-gas thruster control system of claim 11, further comprising one or more gears disposed between the electric motor and the pilot shaft.

19. The hot-gas thruster control system of claim 11, further comprising a valve position sensor coupled to the poppet valve, the valve position sensor configured to sense poppet valve position and supply a valve position signal representative thereof to the control.

20. A hot-gas thruster, comprising:
- a thruster body having an inlet port, an outlet port, and an inner surface that defines a valve chamber, the inlet port for receiving a flow of hot gas, the outlet port defining a valve seat and a thrust nozzle;
- a poppet valve disposed at least partially within the valve chamber and including a control surface, a seating surface, an outer surface between the control surface and the seating surface, an internal cavity, a chamber-to-cavity orifice, and a main vent orifice in fluid communication with the outlet port, the poppet valve defining a control chamber between the control surface and the inner surface of the thruster body, the control chamber in continuous fluid communication with the internal cavity via the chamber-to-cavity orifice and in continuous fluid communication with the inlet port via a fill orifice, the poppet valve movable between a closed position, in which the seating surface engages the valve seat, and a plurality of open positions, in which the seating surface does not engage the valve seat;
- a suspension spring housing coupled to the poppet valve, the suspension spring housing comprising an inner surface that defines a first housing engagement surface and a second housing engagement surface;
- a pilot shaft extending through the suspension spring housing and into the internal cavity of the poppet valve, the pilot shaft comprising a radially extending flange including a first flange engagement surface and an opposing second flange engagement surface, the pilot shaft adapted to receive a drive force and responsive thereto to selectively move in either a first direction or a second direction;
- a first preload spring disposed within the suspension spring housing, the first preload spring engaging the first housing engagement surface and the first flange engagement surface and supplying a first preload force thereto; and
- a second preload spring disposed within the suspension spring housing, the second preload spring engaging the second housing engagement surface and the second flange engagement surface and supplying a second preload forces thereto, wherein:
- when the pilot shaft moves in the first direction, fluid pressure in the control chamber is vented via the vent orifice to allow the poppet valve to move toward an open position, and
- when the pilot shaft moves in the second direction, fluid pressure in the control chamber aids the pilot shaft to move the poppet valve toward the closed position.

* * * * *